US010050752B1

(12) United States Patent
Bales et al.

(10) Patent No.: US 10,050,752 B1
(45) Date of Patent: Aug. 14, 2018

(54) RADIAL ANTENNA FOR SMALL CELL WITH A NULL FEATURE

(71) Applicant: Sprint Communications Company L.P., Overland Park, KS (US)

(72) Inventors: Stephen R. Bales, Lee's Summit, MO (US); Martin D. Zeller, Trimble, MO (US); Maneesh Gauba, Overland Park, KS (US); Eugene S. Mitchell, Jr., Blue Springs, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 156 days.

(21) Appl. No.: 14/616,335

(22) Filed: Feb. 6, 2015

(51) Int. Cl.
*H01Q 3/24* (2006.01)
*H04L 5/00* (2006.01)
*H04W 76/06* (2009.01)
*H04W 76/34* (2018.01)

(52) U.S. Cl.
CPC ........... *H04L 5/0032* (2013.01); *H01Q 3/242* (2013.01); *H04W 76/064* (2013.01); *H04W 76/34* (2018.02)

(58) Field of Classification Search
CPC .. H04L 5/0032; H04W 76/064; H04W 36/20; H04W 36/30; H01Q 3/00; H01Q 3/242
USPC ..................... 343/799, 890; 455/68
See application file for complete search history.

(56) References Cited

U.S. PATENT DOCUMENTS

| | | | | |
|---|---|---|---|---|
| 4,123,759 A | * | 10/1978 | Hines | H01Q 3/40 342/371 |
| 9,271,168 B2 | * | 2/2016 | Haghighat | H04W 24/02 |
| 2003/0184490 A1 | * | 10/2003 | Raiman | H01Q 21/20 343/799 |
| 2010/0066590 A1 | * | 3/2010 | Brown | G01S 7/03 342/147 |
| 2010/0069019 A1 | * | 3/2010 | Nagy | H01Q 1/38 455/68 |
| 2013/0194950 A1 | * | 8/2013 | Haghighat | H04W 24/02 370/252 |
| 2014/0146782 A1 | * | 5/2014 | Gerlach | H04W 72/0426 370/329 |
| 2014/0313080 A1 | * | 10/2014 | Smith | H01Q 3/00 342/372 |
| 2015/0189568 A1 | * | 7/2015 | Stanze | H04B 7/0417 370/331 |

* cited by examiner

*Primary Examiner* — Edan Orgad
*Assistant Examiner* — Saumit Shah

(57) ABSTRACT

A device, method, and computer-readable medium are provided for adjusting omnidirectional antenna array elements for mitigating cross interference between communication network cells. Radially disposed antenna array elements are configured to collectively function as a single omnidirectional antenna assembly at a cell. Signal data associated with signal strength and/or quality is monitored and received. Based on the signal data received, at least one antenna array element is selected for disconnection from the antenna assembly. The at least one antenna array element is disconnected from the assembly to nullify at least a portion of the omnidirectional signal distributed therefrom, thereby mitigating cross-interference with a neighboring cell.

19 Claims, 6 Drawing Sheets

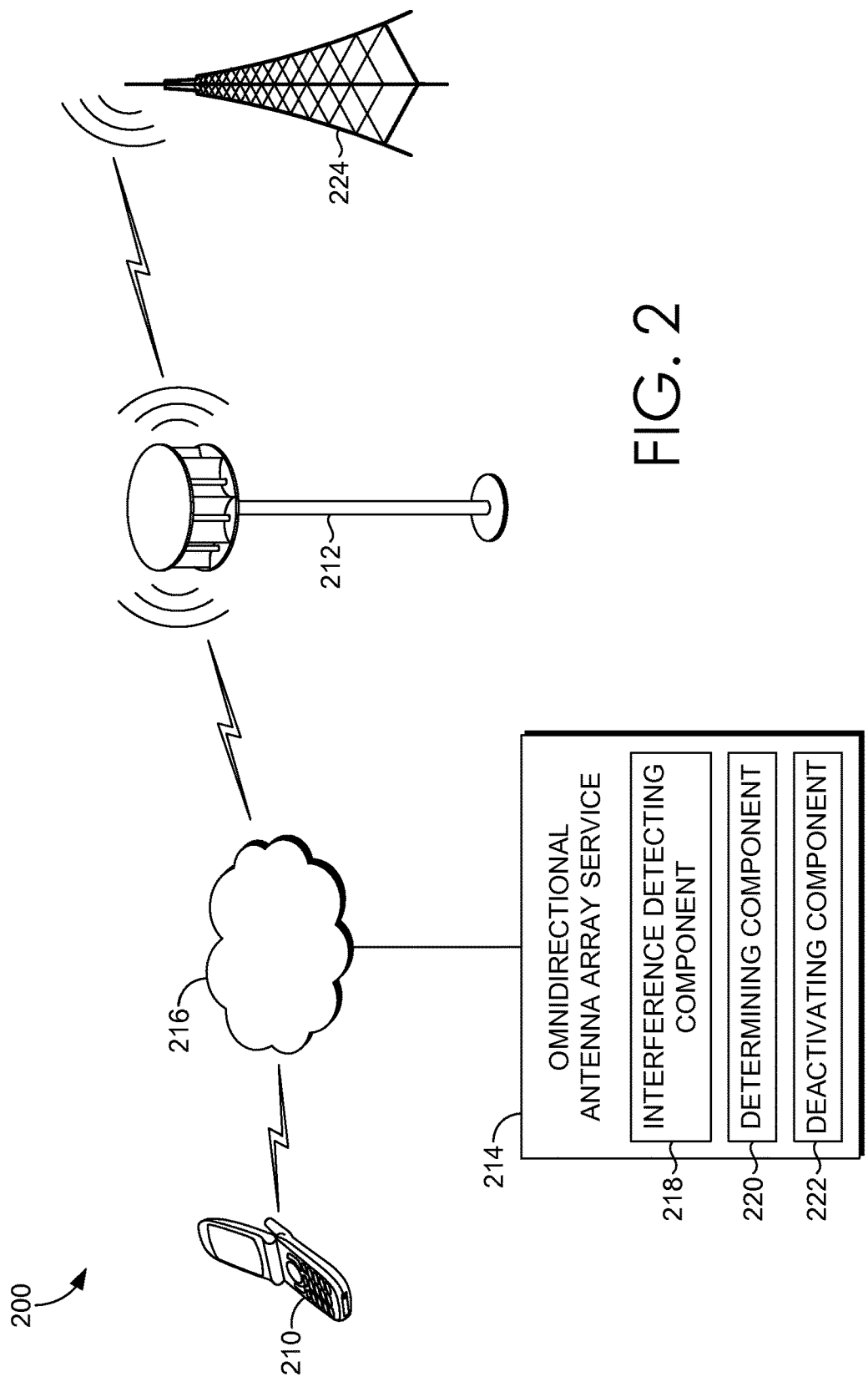

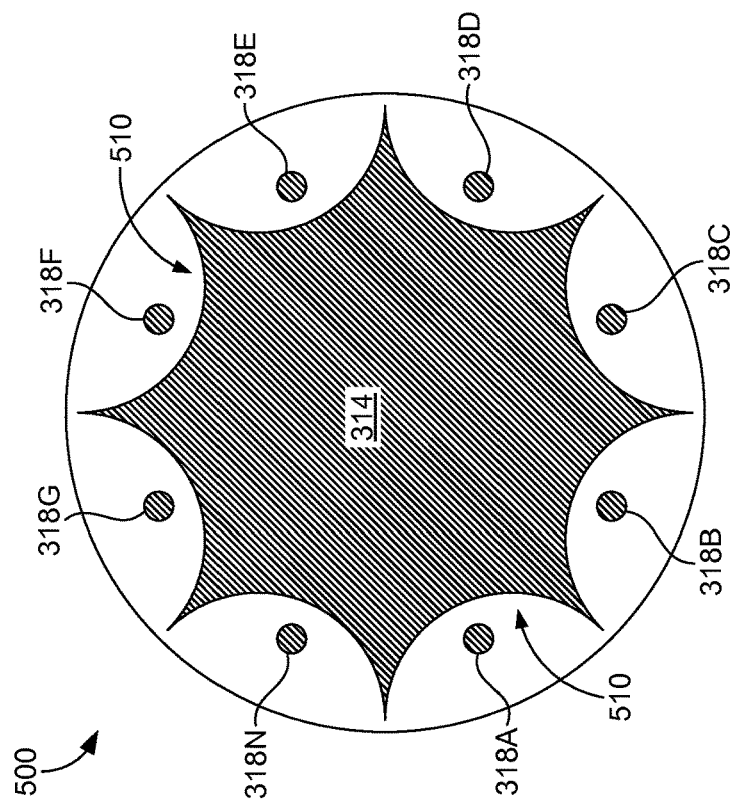
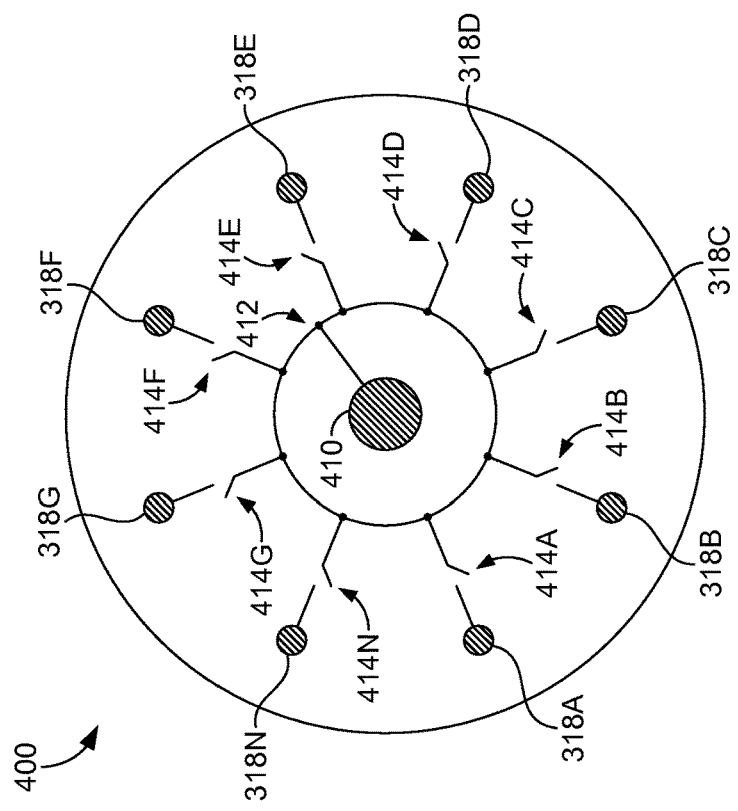
FIG. 5
FIG. 4

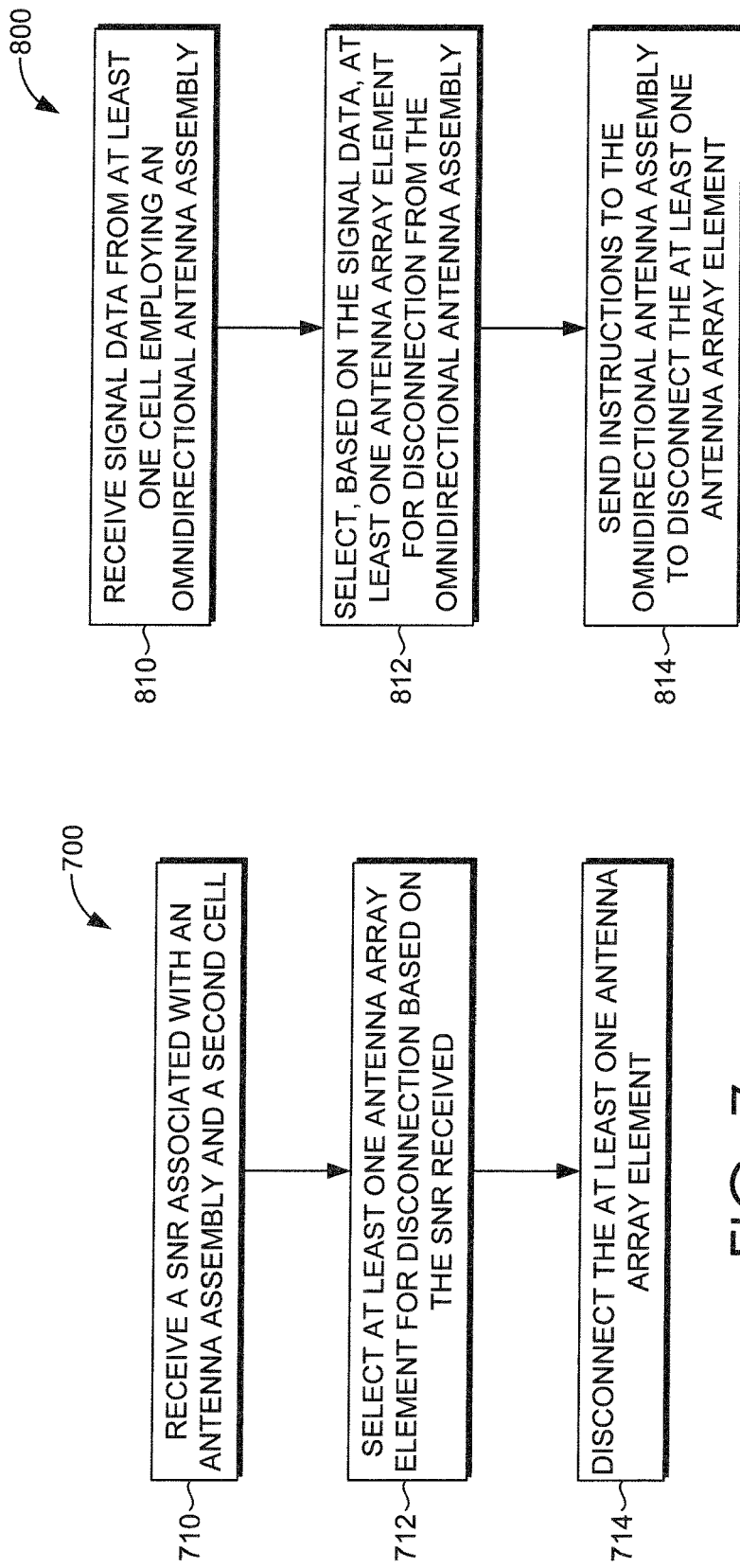

RADIAL ANTENNA FOR SMALL CELL WITH A NULL FEATURE

SUMMARY

A high-level overview of various aspects of the invention are provided here for that reason, to provide an overview of the disclosure and to introduce a selection of concepts that are further described below in the detailed-description section below. This summary is not intended to identify key features or essential features of the claimed subject matter, nor is it intended to be used as an aid in isolation to determine the scope of the claimed subject matter. In brief and at a high level, this disclosure describes, among other things, devices, methods, and systems for adjusting omnidirectional antenna array elements to mitigate cross interference between cells. For instance, in one embodiment, an omnidirectional antenna assembly is provided at a cell. The antenna assembly includes an omnidirectional transmission component comprising multiple omnidirectional antenna array elements that are each connected in parallel and are configured for coupling to a radiofrequency (RF) source for distributing an omnidirectional RF signal therefrom. The antenna array elements are disposed in a radial configuration and, when connected to the RF source, may collectively function as a single omnidirectional antenna. Each antenna array element can independently be disconnected from the circuit to nullify parts of the omnidirectional RF signal distributing therefrom to reduce cross interference between the omnidirectional antenna assembly and a neighboring cell.

BRIEF DESCRIPTION OF THE SEVERAL VIEWS OF THE DRAWINGS

Illustrative embodiments of the present invention are described in detail below with reference to the attached drawing figures, and wherein:

FIG. 2 is a block diagram depicting an exemplary operating environment suitable for use in embodiments of the invention;

FIG. 4 is a top plan view of an exemplary circuit diagram suitable for use in embodiments of the invention;

FIG. 5 is a cross-sectional top plan view of the antenna assembly, particularly illustrating the interior of the antenna assembly in accordance with an embodiment of the invention;

FIG. 7 is a flow diagram showing an exemplary method for mitigating cross interference between a first cell and a second cell, in accordance with embodiments described herein; and FIG. 8 is a flow diagram showing an exemplary method for dynamically optimizing omnidirectional settings of antenna systems based on signal data, in accordance with embodiments described herein.

DETAILED DESCRIPTION

Figure 1:
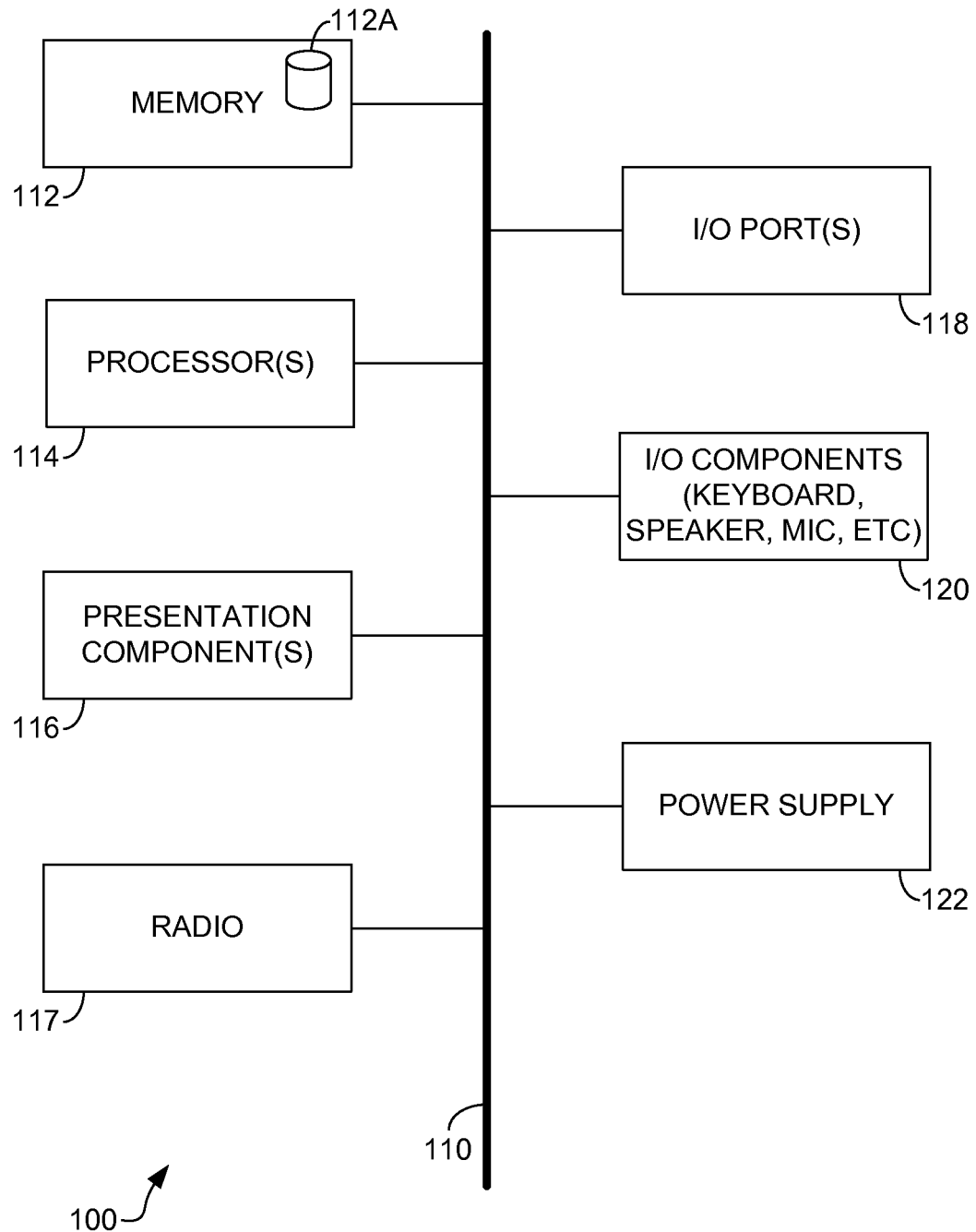
FIG. 1 is a block diagram of a mobile device in accordance with an embodiment of the present invention.

The subject matter of select embodiments of the present invention is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

An antenna system may refer to an electrical device that converts electrical power to radio waves (RF signals) or vice versa. An antenna system can be used with radio transmitters (RF source) or radio receivers. An antenna system can be made up of one or more antennas. In some embodiments, antenna systems may include sector antennas that are directional microwave antennas with a sector-shaped distribution pattern. In other embodiments, antenna systems may include omnidirectional antennas that distribute a 360° beamwidth. Antenna systems can be used for telecommunications, for example, wireless communications networks at cell (base station) sites. Antenna systems can also be used for other types of mobile communications, for example, in Wi-Fi networks. A wireless communications network includes cellular networks or mobile networks distributed over land areas called cells. Each cell can be served by one fixed-location transceiver, known as a cell, cell site or base station. In a cellular network, for example, each cell may use a different set of frequencies from neighboring cells to avoid interference and provide guaranteed bandwidth within each cell.

Modern networks (e.g., heterogeneous networks) include different types of cells. At a basic level, heterogeneous networks provide for complementing high-power cells (e.g., macrocells) with low-power cells (e.g., femtocells and picocells). A macrocell is a cell in a network that provides radio coverage served by a high-power cellular base station (tower). A femtocell is a small, low-power cellular base station, typically designed for use in a home or small business. A femtocell may connect the service provider's wireless communications network via broadband to support several active mobile devices in a residential setting or enterprise setting. Similarly, a picocell is a small cellular base station typically covering a small area, such as in-building (e.g., offices, shopping malls, train stations) or in-aircraft. A picocell extends coverage to indoor areas where outdoor signals do not reach well, or add network capacity in areas with very dense phone usage. The concept of femtocells and picocells can be applied to different radio access technologies. For purposes of a detailed discussion, the femtocells and picocells will be discussed with reference to an LTE system. Thousands of femtocells and picocells inside a network area create optimization considerations, as such, optimizing network performance includes analyzing the macrocells, femtocells, and picocells network parameter measurements (signal data).

A network design process, for a wireless communications network or Wi-Fi network, consists of planning and optimization. In general, network planning refers to the process of designing a network structure and determining network elements. Network optimization, in turn, refers to finding a network configuration to achieve peak performance. In this regard, optimization includes achieving the best possible results from the network elements (e.g., antenna systems). A baseline antenna system setting may be determined, such as an azimuth and tilt setting, based on planning and optimizing the wireless communications network. In some configurations, optimization of antenna systems can further be facilitated by remote optimization devices, for instance, devices commonly found in Self-Optimizing Networks (SONs).

Conventional directional antenna settings (i.e., azimuth, tilt, etc.) can be adjusted to significantly affect inter-cell interference, coverage, and overall network performance. By way of example, antenna azimuth refers to the horizontal angle between the north and the directional antenna's main lobe direction. Antenna azimuth may influence service coverage as well as overlap. Adjusting antenna azimuth, for example, can significantly reduce cell overlap while sacrificing coverage. Less cell overlap, in turn, improves inter-cell and intra-cell interference, power consumption, and capacity. Antenna tilt is the angle of the main beam of a directional antenna below the horizontal plane. It is measured in degrees and can have positive and negative values. Positive values mean that the beam is directed downwards; the procedure is called downtilting, and the tilt value is referred to as downtilt. Negative values mean that the beam is directed upwards; the procedure is uptilting, and the tilt value becomes uptilt. A tilt value of 0° shows that the direction of the main beam is parallel to the ground and points towards the horizon. Downtilting a directional antenna may reduce inter-cell interference in order to increase the relative strength of signals from the home cell. Interference reduction increases cell capacity and improves performance of the entire network.

Oftentimes, low-power cells (e.g., picocells) are placed within the signal range or "time of flight" of a high-power cell (e.g, macrocells) having the same frequency. Unlike many cells which may include adjustable directional antennas, as described above, low-power cells may include omnidirectional antennas for distributing a signal to cover a large immediately-surrounding area. Omnidirectional antennas are typically used to cover large areas with a signal, as they distribute RF signals in all directions—having a 360° beamwidth. The disadvantage of omnidirectional antennas, however, is that they receive interference from all directions, even from directions where no communicating client is present. As such, conventional methods for adjusting directional antenna settings (i.e., azimuth and tilt) are not applicable to low-power cells incorporating omnidirectional antennas. In that regard, cross interference between the low-power cells with omnidirectional antennas and neighboring high-power cells may negatively affect network performance with increased signal interference.

The present invention may be embodied as, among other things, a device, method, system, or a set of instructions embodied on one or more computer-readable media. Aspects hereof relate to an omnidirectional antenna assembly having a plurality of omnidirectional antenna array elements, each of which can be deactivated to nullify portions of an omnidirectional beamwidth distributed therefrom to mitigate interference associated with neighboring cells within the communication range. Traditionally, omnidirectional antennas include a single antenna element that distributes signals in a fixed 360° beamwidth. By having multiple omnidirectional antenna array elements collectively functioning as a single omnidirectional antenna, the benefits associated with an omnidirectional antenna are preserved. However, with the ability to disable individual array elements collectively responsible for distributing the omnidirectional beamwidth, portions of the omnidirectional beamwidth responsible for the interference may be nullified to improve and/or optimize signal quality.

Accordingly, in one aspect, the present invention is directed to an omnidirectional antenna assembly. The antenna assembly comprises a mounting structure and an omnidirectional transmission component fixed relative to the mounting structure. The mounting structure includes a core and a supporting member. The omnidirectional transmission component comprises a plurality of antenna array elements selectively connected to a parallel circuit and configured to couple to a radiofrequency (RF) source for distributing an omnidirectional RF signal. The plurality of antenna array elements is radially spaced around the core and is secured to the supporting member. Each antenna array element is configured to selectively disconnect from the parallel circuit to nullify at least a portion of the omnidirectional RF signal received from the RF source.

In another aspect, a method is provided for mitigating cross interference between a first cell and a second cell. The method includes providing an omnidirectional antenna assembly at the first cell. The omnidirectional antenna assembly includes a plurality of interconnected radially disposed antenna array elements distributing an omnidirectional RF signal. The method further includes receiving the measured signal-to-noise ratio between the first cell and the second cell. Further, the method includes selecting, based on the signal-to-noise ratio received, at least one antenna array element from the plurality of antenna array elements for disconnection from the omnidirectional antenna assembly. The method also includes disconnecting the at least one antenna array element for nullifying at least a portion of the omnidirectional RF signal.

In a third aspect, one or more computer-storage media having computer-executable instructions embodied thereon are provided that, when executed, performs a method for dynamically optimizing the omnidirectional settings of antenna systems based on analyzing network parameters. The method includes receiving, over a communications network, signal data from at least one cell employing an omnidirectional antenna assembly coupled to an RF source. The method further includes selecting, based at least on the signal data, at least one antenna array element from a plurality of antenna array elements employed by the omnidirectional antenna assembly for disconnection from the RF source. The method also includes sending, over the communications network, instructions to the omnidirectional antenna assembly to disconnect the at least one antenna array element from the RF source, thereby nullifying at least a portion of the omnidirectional RF signal to mitigate cross interference.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

CDMA Code Division Multiple Access
eNodeB Evolved Node B
GPRS General Packet Radio Service
GSM Global System for Mobile Communications
LTE Long-Term Evolution
MD Mobile Device RF Radio-Frequency
RSRP Reference Signal Receive Power
RSRQ Reference Signal Receive Quality
RSSI Received Signal Strength Indicator
SINR Signal-to-Interference-Plus-Noise Ratio
SNR Signal-to-noise ratio
SON Self-Optimizing Networks
UMTS Universal Mobile Telecommunications System
WCDMA Wideband Code Division Multiple Access Further, various technical terms are used throughout this description. An illustrative resource that fleshes out various aspects of these terms can be found in Newton's Telecom Dictionary, 25th Edition (2009).

Embodiments of our technology may be embodied as, among other things, a device, method, system, or computer-program product. Accordingly, the embodiments may take the form of a hardware embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and non-removable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Turning now to FIG. 1, a block diagram of an illustrative mobile device is provided and referenced generally by the numeral 100. Although some components are shown in the singular, they may be plural. For example, mobile device 100 might include multiple processors or multiple radios, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

Memory 112 might take the form of one or more of the aforementioned media. Thus, we will not elaborate more here, only to say that memory component 112 can include any type of medium that is capable of storing information in a manner readable by a computing device. Processor 114 might actually be multiple processors that receive instructions and process them accordingly. Presentation component 116 includes the likes of a display and a speaker, as well as other components that can present information (such as a lamp (LED), or even lighted keyboards).

Radio 117 represents a radio that facilitates communication with a wireless telecommunications network. Illustrative wireless telecommunications technologies include Long Term Evolution (LTE) and Evolved Data Optimized (EVDO) and the like. In some embodiments, radio 117 might also facilitate other types of wireless communications including Wi-Fi communications.

Input/output port 118 might take on a variety of forms. Illustrative input/output ports include a USB jack, stereo jack, infrared port, proprietary communications ports, and the like. Input/output components 120 include items such as keyboards, microphones, touchscreens, and any other item usable to directly or indirectly input data into mobile device 100. Power supply 122 includes items such as batteries, fuel cells, or any other component that can act as a power source to power mobile device 100.

Turning now to FIG. 2, FIG. 2 depicts an exemplary network environment 200 suitable for use in implementing embodiments of the present invention. The network environment 200 is but one example of a suitable network environment and is not intended to suggest any limitation as to the scope of use or functionality of the invention. Neither should the network environment 200 be interpreted as having any dependency or requirement relating to any one or combinations of components illustrated.

In the network environment 200, one or more mobile devices 210 may communicate with other devices, such as mobile devices, servers, etc. The mobile device 210 may take on a variety of forms, such as a personal computer (PC), a laptop computer, a tablet, a notebook, a mobile phone, a Smart phone, a personal digital assistant (PDA), or any other device that is capable of wirelessly communicating with the other devices using the network 200. The mobile device 210 may comprise the mobile device 100 of FIG. 1, and as such can include, for example, a display(s), a power source(s) (e.g., a battery), a data store(s), a speaker(s), memory, a buffer(s), an antenna, and the like. In embodiments, the mobile device 210 comprises a wireless or mobile device with which a wireless-telecommunication-network(s) (e.g., the network environment 200) can be utilized for communication (e.g., voice and/or data communication). In this regard, the mobile device 210 can be any mobile computing device that communicates by way of, for example, a 3G or 4G network.

The mobile device 210 can utilize a network 216 to communicate with other computing devices (e.g., a mobile device(s), a server(s), a personal computer(s), etc.) and/or with a base station such as the cell 212. In embodiments, the network 216 is a telecommunications network(s), or a portion thereof. A telecommunications network might include an array of devices or components, some of which are not shown so as to not obscure more relevant aspects of the invention. Components such as terminals, links, and nodes (as well as other components) can provide connectivity in some embodiments. The network 216 can include multiple networks, as well as being a network of networks, but is shown in more simple form so as to not obscure other aspects of the present invention. The network 216 can be part of a telecommunications network that connects subscribers or users to their immediate service provider. In embodiments, the network 216 can be associated with a telecommunications provider that provides services to mobile devices, such as the mobile device 210. For example, the network 216 may provide voice and/or data services to mobile devices or corresponding users that are registered to utilize the services provided by a telecommunications provider. The network 216 can be any communication network providing voice and/or data service(s), such as, for example, a 1× circuit voice, a 3G network (e.g., CDMA, CDMA2000, WCDMA, GSM, UMTS), or a 4G network (WiMAX, LTE, HSDPA).

The network environment 200 may include a database (not shown). The database may be similar to the memory component 112A of FIG. 1 and can be any type of medium that is capable of storing information. The database can be any collection of records. In one embodiment, the database includes a set of embodied computer-executable instructions that, when executed, facilitate various aspects disclosed herein. These embodied instructions will variously be referred to as "instructions" or an "application" for short.

The network environment 200 also includes the cell 212 and an omnidirectional antenna array service 214. The cell 212 may, in an LTE network, be known as an eNodeB. The cell 212 may be associated with the network 216 and communicate with, for instance, the mobile device 210. The communication may involve receiving RF signals from the mobile device 210 using one or more antenna array elements and transmitting RF signals to the user device 210 using the one or more antenna array elements. The components of network environment 200 have been illustrated separately but may, in fact, be integrated into a single component. For instance, the omnidirectional antenna array service 214 may be a component of the cell 212.

The omnidirectional antenna array service 214 includes at least an interference detecting component 218, a determining component 220, and a deactivating component 222. The interference detecting component 218 is adapted to, among other things, detect an interfering communication or RF signal, such as a communication signal from a neighboring cell (for instance, macrocell 224 of FIG. 2). More specifically, the interference detecting component 218 may be configured to monitor and measure local RF signals and/or interfering RF signals from a plurality of cells within the communication range. In aspects, the interference detecting component 218 may further be configured to detect and/or measure various forms of signal data (i.e., signal-to-noise ratios). In other aspects, the interference detecting component 218 may be configured to receive measurements of signal data from a signal data measuring module (not shown), and monitor the signal data as it is received by the signal data measuring module.

The determining component 220 of the omnidirectional antenna array service 214 is configured to analyze the local RF signals and/or interfering RF signals to determine a number of different network parameter measurements associated with the interfering signal. Select network parameter measurements may provide direct or indirect information about the strength and/or quality of the uplink and downlink RF signals (the communication signal from the cell to the mobile device). In aspects, analysis of the network parameter measurements may indicate an azimuthal direction at which the different neighboring cells are currently oriented relative to the cell. In other aspects, the RF signal parameters may further be analyzed to indicate where the communicating mobile devices are located. Exemplary network parameter measurements (signal data) may include, for example, signal-to-noise ratio (SNR), received signal strength indicator (RSSI), received channel power indicator (RCPI), reference signal received power (RSRP), reference signal receive quality (RSRQ), and the like.

In response to the determinations made by the determining component 220, the deactivating component 222 is configured to deactivate at least one of the omnidirectional antenna array elements that distributes a portion of the omnidirectional beamwidth. As used throughout this disclosure, the term "deactivate" means to disable at least one of the omnidirectional antenna array elements to nullify its ability to transmit and/or receive communication signals. In aspects, this may be done by disconnecting one or more omnidirectional antenna array elements from the RF source.

Figure 3B:
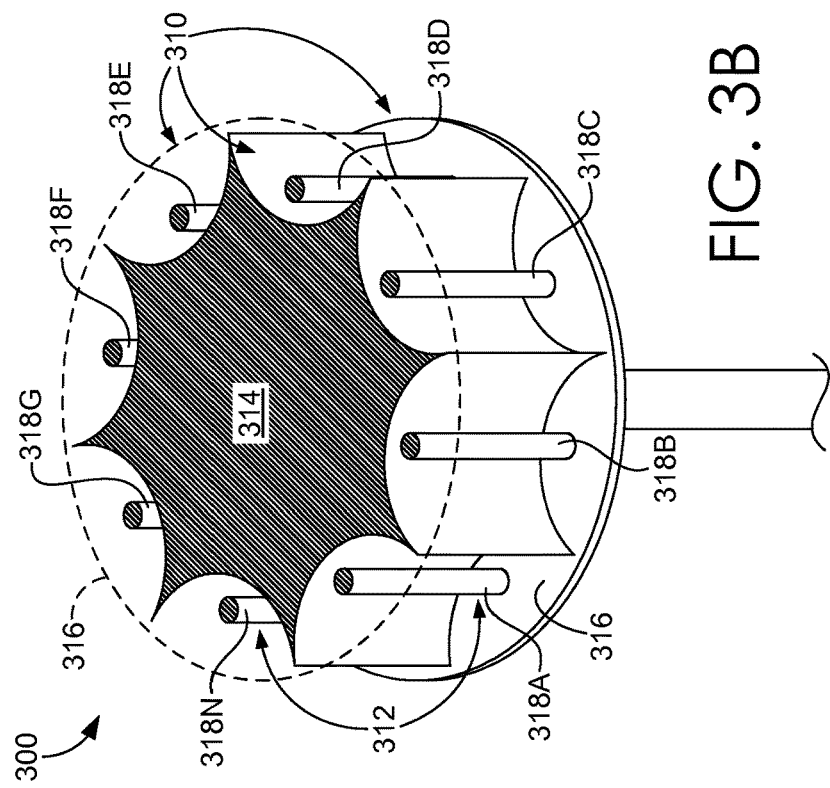
FIG. 3B is a partial cut-away side perspective view of the omnidirectional antenna assembly of FIG. 3A, particularly illustrating an interior of the antenna assembly in accordance with an embodiment of the invention.
Figure 3A:
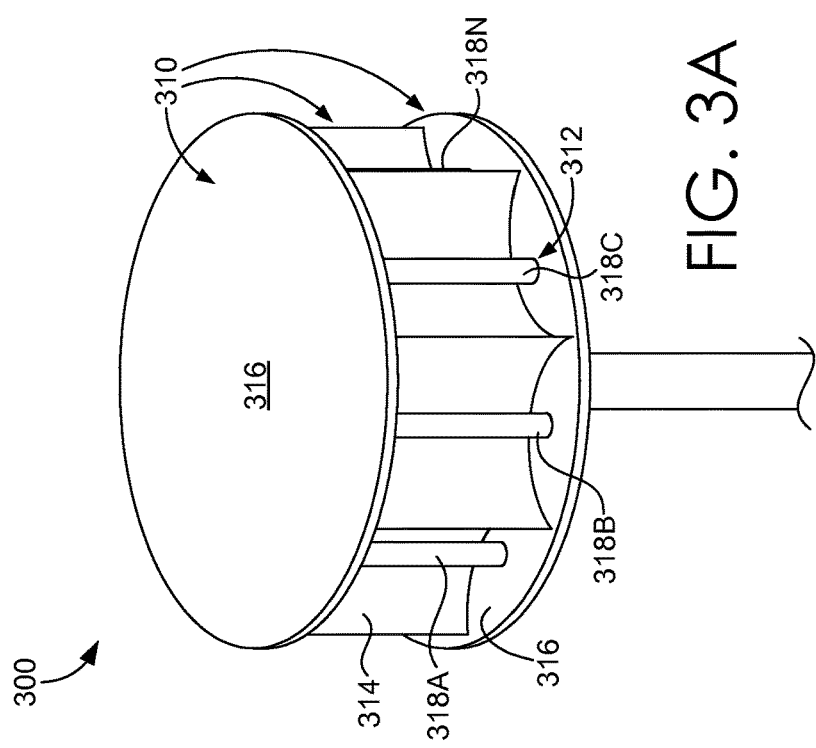
FIG. 3A is a side perspective view of an omnidirectional antenna assembly in accordance with an embodiment of the invention.

FIGS. 3A-3B depict an omnidirectional antenna assembly 300 having a plurality of omnidirectional antenna array elements in an exemplary configuration in accordance with aspects provided herein. The omnidirectional antenna assembly 300 may be associated with a communications cell, such as the cell 212 of FIG. 2. The antenna assembly 300 is comprised of a mounting structure 310 for securing an omnidirectional transmission component 312. The mounting structure 310 includes a core 314 and a supporting member 316. The core 314 and supporting member 316 may be comprised of a waveguiding material, including low bulk resistivity metals, like brass, copper, silver, aluminum, and others. The omnidirectional transmission component 312 is secured to the mounting structure 310 and comprises a plurality of omnidirectional antenna array elements 318A, 318B, 318C, . . . 318N. More specifically, the transmission component 312 includes antenna array elements 318A . . . 318N that are each connected, selectively in parallel, and are configured for coupling to an RF source (not shown) for collectively distributing an omnidirectional RF signal. In other words, the omnidirectional antenna array elements 318A . . . 318N are interconnected, via a parallel circuit, directly or indirectly to the RF source and can each be disconnected from the circuit without affecting the circuit connection of the other antenna array elements. The plurality of antenna array elements 318A . . . 318N are radially spaced around the core 314. This collective configuration results in a single omnidirectional antenna assembly 300 for collectively distributing a 360° beamwidth. One or more array elements can be individually disconnected (herein also referred to as "nullified") to create null portions in the 360° beamwidth, thereby reducing interference between signals distributed from the one or more array elements and another interfering cell (for instance, macrocell 224 of FIG. 2).

The number, configuration, and spacing of antenna array elements in the illustrated antenna assembly 300 are exemplary only and other configurations are contemplated herein. In embodiments, the number and arrangement of antenna array elements is best configured when considering the frequency of the RF band supplied thereto. In order to determine the best configuration for the number of array elements and spacing between antenna array elements, in a generally circular embodiment, a calculation considering the band frequency must be performed. In other words, provided a known circumference and RF band, the number of array elements and spacing between the array elements can be calculated. The formula for spacing distance (L) between the radially disposed array elements is: $L=(3/8)*(\text{speed of light}/\text{frequency})$. By way of example only, optimal spacing distance (L) for a 2.5 GHz (2,500,000,000 Hz) frequency band can be calculated as: $L=(3/8)*(299{,}792{,}458 \text{ meters per second}/2{,}500{,}000{,}000 \text{ Hz})=0.04496 \text{ meters}=4.5 \text{ cm}$. As such, each array element can be spaced approximately 4.5 cm apart to achieve optimal performance from the omnidirectional antenna assembly using the 2.5 GHz band. On that end, assuming build requirements for antenna array elements of an omnidirectional antenna assembly requires a diameter (d) of 14.35 cm and a circumference (C) of 45.08 cm, the number of elements (N)=(C/L)=(45.08 cm/4.5 cm)=approximately 10.03 antenna array elements, each array element being spaced approximately 4.5 cm apart.

Turning now to FIG. 4, a simplified circuit diagram 400 is illustrated to show how, for example, the antenna array elements 318A . . . 318N are connected in parallel to a single RF supply 410. Though not illustrated, the supply 410 is adapted to be coupled to an RF source (not shown). The supply 410 is connected to a parallel circuit 412, which provides a connection from the RF supply 410 to each of the antenna array elements 318A . . . 318N. Each of the antenna array elements 318A . . . 318N are coupled to a corresponding switching mechanism 414A . . . 414N, which can selectively connect or disconnect each antenna array element to the RF supply 410. In some embodiments, the switching mechanism 414A . . . 414N is a manually controlled circuit switch. In other embodiments, the switching mechanism 414A . . . 414N is an electronically controlled circuit switch that can be coupled to a controller (not shown) for automated connection to or disconnection from the RF supply 410.

Turning now to FIG. 5 and using FIG. 3B for reference purposes, a top elevation view of the omnidirectional antenna assembly 300 is shown, particularly illustrating the core 314. The core 314 is configured presenting a plurality of concave faces 510, with each face 510 corresponding to each one of the antenna array elements 318A . . . 318N. As previously described, the core 314, or at least the radially-outwardly-facing surface thereof, may be comprised of a waveguiding material, so as to reflect or guide RF signals emitted from the antenna array elements 318A . . . 318N radially away from the core and to further prevent cross-interference from each another. Although the illustrated faces 510 appear to be circular in nature, any shape may be considered within the scope of the present invention (e.g., elliptical, angular, smooth). The core 314 can be constructed in the form of a single core component, as illustrated, or may be comprised of multiple core subcomponents, each having a concave waveguiding face.

Figure 6:
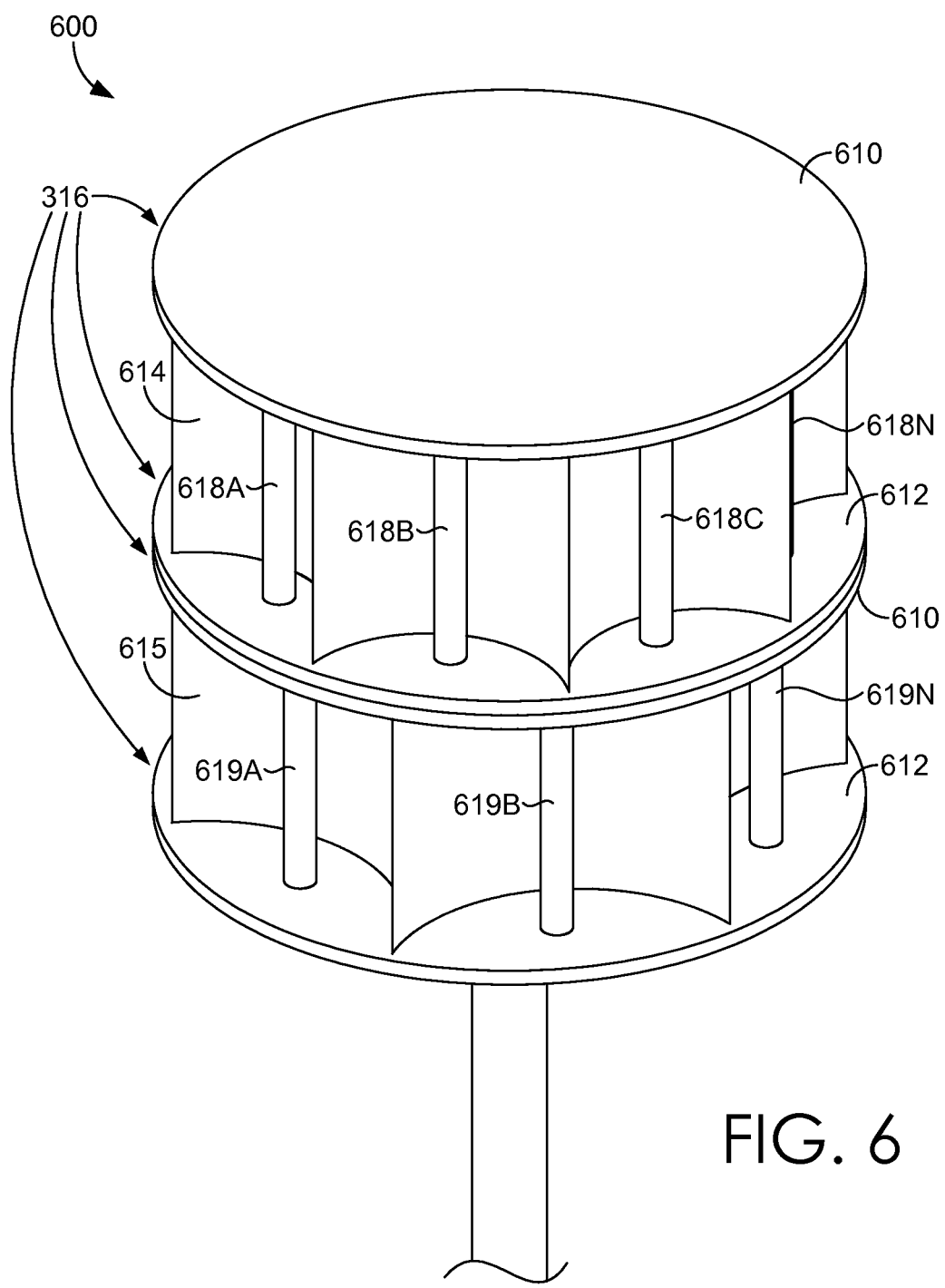
FIG. 6 is a side perspective view of an omnidirectional antenna assembly in a stacked configuration, also in accordance with an embodiment of the invention.

FIG. 6 illustrates a stacked configuration 600 of two omnidirectional antenna assemblies, similar to the described embodiments in FIGS. 3-6. As illustrated in FIGS. 3A and 3B, the omnidirectional antenna assembly 300 includes a mounting structure 310. In embodiments, the mounting structure 310 may include a top plate 610 and a bottom plate 612. The top plate 610 is adapted to securely and/or removably attach to the bottom plate 612 of second omnidirectional antenna assembly, as illustrated. Although the securing mechanism is not illustrated, any securing mechanism known in the art may be considered for use in the present invention (e.g., latches, bolts/nuts, snaps, screws, fixing members, etc.). Illustrated in FIG. 6 are two omnidirectional antenna assemblies, each having different antenna array configurations. In some embodiments, a stacked configuration, as illustrated, may be considered for use when a single cell is configured to distribute different RF signals of different bands. As described above, each of the antenna assemblies may be optimally configured as a function of the RF band supplied by the RF source and a circumference defined by the antenna array elements.

Referring now to FIG. 7, a flowchart illustrates a method 700 for mitigating cross interference between a first cell and a second cell. Initially, at step 710, an omnidirectional antenna assembly (for instance, omnidirectional antenna assembly 300 of FIGS. 3A-3B) is provided at the first cell. As described above, the omnidirectional antenna assembly includes a plurality of interconnected and radially disposed antenna array elements (for instance, array elements 318A . . . 318N of FIGS. 3A-3B) that collectively distribute an omnidirectional RF signal.

At step 720, signal data associated with at least the omnidirectional antenna assembly is received. The signal data may include network parameter measurements (e.g., signal-to-noise ratios) associated with the omnidirectional antenna assembly alone, or between the omnidirectional antenna assembly and at least one other neighboring cell. At step 730, at least one antenna array element from the plurality of antenna array elements is selected for disconnection based on the signal data received. For instance, a first antenna array element can be selected for disconnection based on a high SNR reading. In some instances, a first antenna array element can be selected for disconnection based on a previous SNR reading. In another instance, one or more antenna array elements can be selected for disconnection based on a high and/or previous SNR reading. In embodiments, a final set of array elements can be selected for disconnection based on a configuration having the most-improved SNR reading. At step 740, the at least one antenna array element selected for disconnection is disconnected. As discussed herein, the antenna array element can be disconnected manually or automatically with a switching mechanism (for instance, using switching mechanism 414A . . . 414N). Disconnection of the at least one antenna array element nullifies at least a portion of the omnidirectional RF signal collectively distributed from the antenna array elements. An optimal configuration of nullified array elements can improve SNR measurements associated with the omnidirectional antenna assembly.

Turning now to FIG. 8, a flowchart illustrates operations 800 performed by one or more computing devices executing computer-executable instructions embodied on one or more computer-storage media for dynamically optimizing omnidirectional settings of antenna systems based on signal data. Initially, at step 810, signal data from at least one cell employing an omnidirectional antenna assembly (for instance, omnidirectional antenna assembly 300 of FIGS. 3A-3B) is received. At step 812, based at least on the signal data received, at least one antenna array element from the omnidirectional antenna assembly is selected for disconnection from an RF source, as described above with respect to omnidirectional antenna assembly 300. Additional factors, such as selection history, relative location of cells, etc., may also influence selection of the at least one antenna array element. At step 814, instructions are sent to the omnidirectional antenna assembly to disconnect the at least one antenna array element selected for disconnection. The aforementioned steps may be performed by any computing device in communication with the communications network, for instance, a computing device typically found in a Self-Optimizing Network. One or more computing devices may execute any or all of the aforementioned instructions, including the steps described above in method 700.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. An omnidirectional antenna assembly comprising:
a mounting structure including a core and a supporting member;
an omnidirectional transmission component fixed relative to the mounting structure,
said omnidirectional transmission component comprising a plurality of antenna array elements selectively connected to a parallel circuit and configured for coupling to a radiofrequency (RF) source for collectively distributing an omnidirectional RF signal of a particular RF signal frequency band, wherein the plurality of antenna array elements includes a particular number of antenna array elements that is defined based on the particular RF signal frequency band, and wherein each antenna array element in the plurality of antenna array elements is spaced from a corresponding adjacent antenna array element of the plurality of antenna elements by a distance that is defined based on the particular RF signal frequency band,
said plurality of antenna array elements being radially spaced around the core and secured to the supporting member,
each of the plurality of antenna array elements being configured to disconnect from the parallel circuit to nullify at least a portion of the omnidirectional RF signal.

2. The omnidirectional antenna assembly of claim 1, wherein the mounting structure is comprised of a waveguide material.

3. The omnidirectional antenna assembly of claim 2, wherein the core presents a plurality of radially extending protrusions, each protrusion being at least partially positioned between each antenna array element and configured to mitigate cross interference there between.

4. The omnidirectional antenna assembly of claim 1, wherein the supporting member includes a top plate and a bottom plate for directing the omnidirectional RF signal radially outward.

5. The omnidirectional antenna assembly of claim 1, wherein the particular number of antenna array elements is further based on a circumference defined by the plurality of antenna array elements.

6. The omnidirectional antenna assembly of claim 1, wherein the omnidirectional antenna assembly is for a picocell.

7. The omnidirectional antenna assembly of claim 1, wherein the RF band is a UMTS frequency band.

8. The omnidirectional antenna assembly of claim 1, the supporting member being adapted to removably attach to another supporting member of another omnidirectional antenna assembly.

9. The omnidirectional antenna assembly of claim 8, wherein the another omnidirectional antenna assembly is configured to couple to another radiofrequency (RF) source for distributing another omnidirectional RF signal.

10. A method for mitigating cross interference between a first cell and a second cell comprising:
determining a signal-to-noise ratio between the second cell and an omnidirectional antenna assembly located at the first cell, the omnidirectional antenna assembly including a plurality of interconnected and radially disposed antenna array elements collectively distributing an omnidirectional RF signal, wherein the plurality of antenna array elements includes a particular number of antenna array elements that is defined based on the particular RF signal frequency band, and wherein each antenna array element in the plurality of antenna array elements is spaced from a corresponding adjacent antenna array element of the plurality of antenna elements by a distance that is defined based on the particular RF signal frequency band;
based on the determined signal-to-noise ratio, selecting at least one antenna array element from the plurality of antenna array elements for disconnection from the omnidirectional antenna assembly;
disconnecting the at least one antenna array element to facilitate an improved signal-to-noise ratio between the omnidirectional antenna assembly and the second cell.

11. The method of claim 10, wherein the receiving, selecting, and disconnecting steps are iteratively repeated until an optimal signal-to-noise ratio is determined.

12. The method of claim 10, wherein the first cell is a picocell and the second cell is a macrocell.

13. The method of claim 10, wherein selecting the at least one antenna array element from the plurality of antenna array elements for disconnection is further based on the azimuthal direction of the second cell relative the first cell.

14. The method of claim 10, wherein the plurality of radially disposed antenna array elements are selectively connected to a parallel circuit and coupled to a radiofrequency (RF) source distributing the omnidirectional RF signal on the particular RF signal frequency band.

15. One or more non-transitory computer-storage media having computer-executable instructions embodied thereon that, when used by one or more computing devices, cause the one or more computing devices to perform operations for dynamically optimizing the omnidirectional settings of antenna systems based on signal data, the operations comprising:
receiving, over a communications network, signal data from at least one cell employing an omnidirectional antenna assembly coupled to an RF source;
selecting, based at least in part on the received signal data, at least one antenna array element from a plurality of radially-positioned antenna array elements employed by the omnidirectional antenna assembly for disconnection from the RF source, wherein the plurality of radially-positioned antenna array elements is configured to include a particular number of antenna array elements that is defined based on the particular RF signal frequency band, and wherein each antenna array element in the plurality of radially-positioned antenna array elements is spaced from a corresponding adjacent antenna array element of the plurality of radially-positioned antenna elements by a distance that is defined based on the particular RF signal frequency band; and
sending, over the communications network, instructions to the omnidirectional antenna assembly, wherein the instructions cause the omnidirectional antenna assembly to disconnect the at least one antenna array element from the RF source and modify the signal data.

16. The one or more non-transitory computer-storage media of claim 15, wherein the selecting step is based further on a history of antenna array elements previously disconnected from the RF source.

17. The one or more non-transitory computer-storage media of claim 15, wherein the signal data comprises a signal-to-noise ratio.

18. The one or more non-transitory computer-storage media of claim 15, wherein disconnecting the at least one antenna array element from the RF source nullifies at least a portion of an omnidirectional RF signal distributed from the at least one cell.

19. The one or more non-transitory computer-storage media of claim 18, wherein nullifying at least a portion of the omnidirectional RF signal improves the signal data.

* * * * *